United States Patent [19]

Wiewiorowski et al.

[11] Patent Number: 5,114,699
[45] Date of Patent: May 19, 1992

[54] SPENT ALKYLATION ACID TREATMENT PROCESS

[75] Inventors: Tadeusz K. Wiewiorowski; Vivian C. Astley, both of New Orleans; Jody J. Taravella; Michael A. Murray, both of Harvey, all of La.

[73] Assignee: Freeport-McMoRan Resource Partners, New Orleans, La.

[21] Appl. No.: 336,791

[22] Filed: Apr. 12, 1989

[51] Int. Cl.[5] .............................. C01B 17/90
[52] U.S. Cl. ........................ 423/531; 423/522; 423/525; 423/528; 423/540
[58] Field of Search ................ 208/13; 423/525, 528, 423/531, 540

[56] References Cited

U.S. PATENT DOCUMENTS

| | | | |
|---|---|---|---|
| 956,276 | 4/1910 | Blacher et al. | 423/528 |
| 2,015,254 | 9/1935 | Caudri | 423/528 |
| 2,067,985 | 1/1937 | Sargent | 423/525 |
| 2,302,825 | 11/1942 | Wilde | 423/525 |
| 2,418,210 | 4/1947 | Wilde | 423/525 |
| 2,441,521 | 5/1948 | Van Der Valk et al. | 423/528 |
| 2,724,638 | 11/1955 | Rueggeberg | 423/525 |
| 2,857,247 | 10/1958 | Putney | 23/173 |
| 2,863,724 | 12/1958 | Skelly et al. | 23/172 |
| 2,903,339 | 9/1959 | Stiles | 23/172 |
| 3,477,814 | 11/1969 | Wilson | 23/173 |
| 4,010,240 | 3/1977 | von Plessen et al. | 423/525 |
| 4,014,982 | 3/1977 | Paull et al. | 423/578 |
| 4,053,573 | 10/1977 | Harrer et al. | 423/531 |
| 4,138,231 | 2/1979 | Hedenas et al. | 423/531 |
| 4,153,628 | 5/1979 | Gerkow et al. | 423/531 |
| 4,157,381 | 6/1979 | Bodenbenner et al. | 423/525 |
| 4,213,958 | 7/1980 | Cameron et al. | 423/522 |
| 4,376,107 | 3/1983 | Morgenthaler | 423/531 |
| 4,377,560 | 3/1983 | Ore | 423/321 R |

OTHER PUBLICATIONS

Fasullo, *Sulfuric Acid, Use and Handling*, McGraw Hill Book Co., 1965, pp. 123-124, 141-144.

Primary Examiner—Wayne Langel
Assistant Examiner—Stephen G. Kalinchak
Attorney, Agent, or Firm—Fisher, Christen & Sabol

[57] ABSTRACT

An improved process for treating spent alkylation acid to recover a sulfuric acid product suitable for use in wet process phosphoric plants particularly those which recover uranium as a byproduct. The process utilizes heat and agitation to polymerize the liquid, soluble organic impurities normally contained in spent alkylation acid to insoluble, carbonaceous solids. The carbonaceous solids formed are relatively inert in acidic environments, easy to handle and have valuable cation exchange and impurity scavenging properties.

51 Claims, 2 Drawing Sheets

SPENT ALKYLATION ACID TREATMENT PROCESS

FIELD OF THE INVENTION

This invention relates to a process for treating spent alkylation acid to recover a sulfuric acid product suitable for use in wet process phosphoric acid plants, including those which recover uranium as a byproduct.

PRIOR ART

Organic materials are often treated with sulfuric acid in order to remove impurities, to initiate chemical reactions between the organic materials and sulfuric acid or to catalyze chemical reactions involving the organic materials. Most of the sulfuric acid discharged from such organic treatment processes is contaminated with organic and other impurities, diluted with water, reduced in acid strength, or in some other manner made undesirable for use in normal chemical operations involving sulfuric acid.

The petroleum industry is a major source of unusable or "spent" sulfuric acid and much of the spent acid of that industry results from the use of sulfuric acid as an alkylation catalyst in the production of high octane gasoline components. The discussion of prior art, herein, will concentrate on spent sulfuric acid resulting from alkylation operations, such acid being hereinafter referred to as spent alkylation acid. Despite the emphasis on alkylation acid, the invented process described herein is not intended to be limited solely to use on spent alkylation acid but may also be used on spent sulfuric acid derived from other operations.

During alkylation operations, the sulfuric acid catalyst becomes contaminated and diluted with organic matter, water, and, to a lesser extent, with other impurities. As a result, the strength of the spent alkylation acid may drop to about 80-90% $H_2SO_4$ versus a typical fresh acid strength of about 98% $H_2SO_4$. The quality of the alkylate is detrimentally affected by the drop in acid strength and the increase in impurity level and eventually the spent acid must be removed from the process and disposed of or treated, i.e., purified, regenerated or reclaimed, for reuse. Disposal operations for spent alkylation acid are expensive and, additionally, the spent acid contains a high concentration of valuable sulfuric acid. Because of these two factors, disposal of the spent acid is avoided if possible. Use of the spent acid, as is, in non-alkylation applications is a promising concept in theory but a concept that often cannot be reduced to practice because the same organic impurities which make the spent acid unusable for alkylation processes also hamper its use in other major industrial operations requiring sulfuric acid, e.g. the production of wet process phosphoric acid via the reaction of phosphate rock and sulfuric acid. For the above reasons, treatment of spent alkylation acid for reuse is desirable.

A number of processes have been used to treat spent alkylation acid for reuse. One of the methods involves diluting the spent acid with water, until an oil layer forms, and separating the two phases by centrifugation or decantation. This method has the disadvantage of requiring extensive refortification of the diluted acid with $SO_3$ or fuming sulfuric acid to restore acid strength.

Another old method involves burning the spent acid, converting the $SO_2$ so produced to $SO_3$, and utilizing the $SO_3$ to produce fresh sulfuric acid.

Other methods of treating spent alkylation acid have been developed. The process of U.S. Pat. No. 2,863,724 contacts the spent acid with a sulfuric acid-immiscible organic liquid as the medium for crystallization and then adjusts the temperature of the mixture to affect sulfuric acid crystallization. The acid crystals are then melted to produce sulfuric acid. U.S. Pat. No. 2,903,339 improves on the '724 process by crystallizing the sulfuric acid under conditions of turbulent agitation. U.S. Pat. No. 2,857,247 also uses a crystallization step to recover sulfuric acid from spent alkylation acid.

The process of U.S. Pat. No. 3,477,814 utilizes controlled heating of alkylation acid to bring about dehydration of the system through the combined agencies of heat and desiccation by the sulfuric acid of the system. This promotes the reactions of desulfation, addition and polymerization, and results in the formation of a system which is composed principally of uncombined sulfuric acid and polymerized, insoluble organic and inorganic matter of such a physical condition that it may be separated from the sulfuric acid in which it is contained. This complicated process which requires handling a viscous, foaming gel appears fraught with potential operating difficulties.

U.S. Pat. Nos. 4,490,347, 4,014,982, 4,153,628, and 4,376,107 describe additional processes for treating spent sulfuric acid.

Despite the abundance of processes that have been developed for treating spent alkylation acid, it is obvious that these processes do not completely meet the needs of industry. Generally, sulfuric acid users outside the petroleum refining industry have not used sulfuric acid treated by the existing treatment processes. For example, the major user of sulfuric acid in industry—the wet process phosphoric acid industry—has been generally unable to use the treated acid. One reason for this reluctance is that the acid treated by many of these processes still contains excessive amounts of crud-forming organic matter and the resulting crud interferes with uranium extraction processes now commonly associated with wet process phosphoric acid plants. (The term "crud," as used in operations wherein uranium is recovered from wet process phosphoric acid, refers to an interfacial emulsion of phosphoric acid, organic extractants used to extract uranium and other organics and other impurities inputed into the system from phosphate rock).

Another reason for the hesitancy of the wet process phosphoric acid industry to use treated alkylation acid is that the treatment processes often detrimentally affect the filtration characteristics of the phosphoric acid subsequently produced. Filtration is a critical operation in wet process phosphoric acid plants and a reduction in filtration rates due to a change in acid filtration characteristics could reduce total plant output.

There is an obvious need in industry for a spent alkylation acid treatment process which produces a sulfuric acid product which is suitable for use in wet process phosphoric acid plants, including plants which employ uranium extraction processes.

An object of this invention is to provide a process for treating spent alkylation acid whereby the sulfuric acid product is satisfactory in quality for use in wet process phosphoric acid plants, including plants which employ processes for extracting uranium from the phosphoric acid product.

SUMMARY OF INVENTION

Spent alkylation acid containing about 80-93% $H_2SO_4$, 2-7% organic carbon and other impurities such as water and various metals, is blended with oleum or sulfuric acid of over 93% $H_2SO_4$ strength to adjust the solids content of the spent alkylation acid (thereby lowering the viscosity of the spent alkylation acid) and to increase the acid strength. Either one or both acids are heated before and/or after blending to produce a temperature in the blended acids of about 275°-350° F. The blended acids are then maintained at this temperature range while being agitated at a moderate to intense rate for at least about 15 minutes, and preferably between about 30 minutes and 2 hours.

The reactions that occur during that time have the effect of converting the liquid soluble organic contaminants contained in the acid to insoluble carbonaceous solids. The insoluble carbonaceous solids are relatively inert in strongly acidic systems and are easier to handle than the liquid soluble contaminants. The carbonaceous solids filter satisfactorily. They can, for example, be efficiently removed on the gypsum filters of wet process phosphoric acid plants. Their inert property allows the solids to pass through phosphoric acid plant acidulation reactors without interfering with chemical reactions taking place.

The invented process described herein can be operated on either a continuous or batch basis.

The treated sulfuric acid produced by this process is satisfactory for many uses. One valuable use is in the acidulation of phosphate rock in wet process phosphoric acid. Such use in wet process phosphoric acid plants is exceptionally valuable when the wet process phosphoric plants employ uranium recovery circuits. It was surprisingly discovered that when the treated alkylation acid was substituted for part of the technical grade sulfuric acid normally used to acidulate phosphate rock, the phosphoric acid produced by the acidulation was found to be superior to the phosphoric acid produced by the acidulation with technical grade sulfuric acid, alone, with regard to uranium-recovery indicators such as acid clarification, crud formation and phase disengagement rates.

The carbonaceous solids produced in the process reactions referred to above were found to have cation exchange properties and, therefore, have a potential value of their own. Additionally, the process produces a concentrated stream of $SO_2$ gas which can be used to produce sulfuric acid or liquid sulfur dioxide.

BRIEF DESCRIPTION OF THE DRAWINGS

FIG. I is a flow diagram illustrating the preferred embodiment of the invented process.

FIG. II is a flow diagram of laboratory equipment arranged to test the preferred embodiment of the invented process.

DETAILED DESCRIPTION OF THE INVENTION

Figure 1:
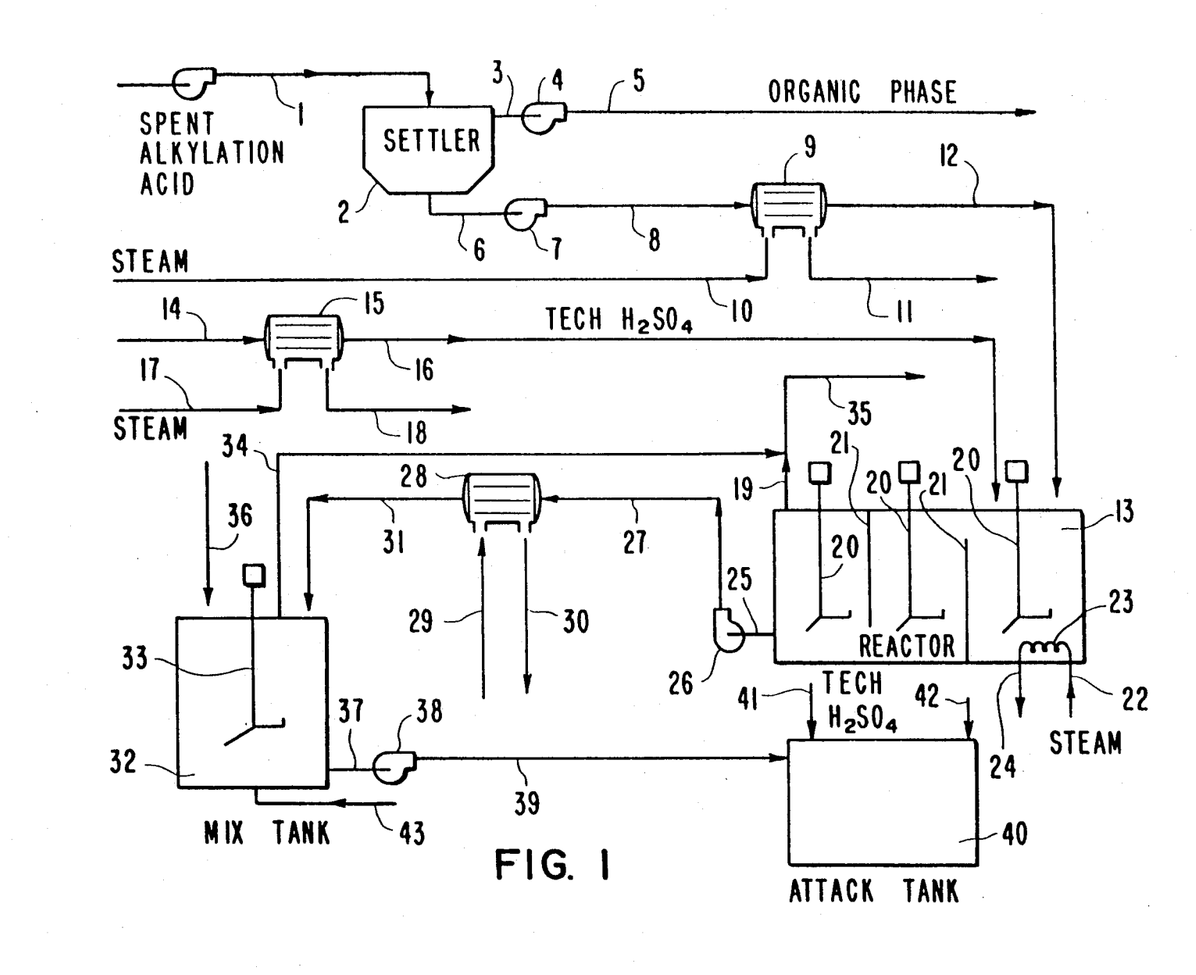

Although the invention can be operated in either the continuous or batch mode, continuous operation is the preferred mode. Referring to FIG. 1, a description of the invented process as it operates in the continuous mode follows:

Spent alkylation acid at ambient temperature of typically about 60°-80° F. and containing typically about 80-93% $H_2SO_4$, 2-7% organic carbon, water and other waste products commonly found in spent alkylation acid, is transferred via line 1 to spent alkylation settling tank 2. In spent alkylation settling tank 2, enough storage time is provided to allow some of the organic carbon compounds contained in the spent acid to separate from the spent acid. The separated organic carbon compounds form a distinct layer on top of the spent acid and are removed from settling tank 2 via pump 4 and lines 3 and 5. The amount of the organic carbon compounds separated and removed by this settling technique depends to a large degree on the source of the spent alkylation acid since different refineries produce spent alkylation acids with varying acid-organic separation characteristics. The spent acid is removed as needed from spent alkylation settling tank 2 via pump 7 and lines 6 and 8. The spent acid, now typically containing about 2-5% organic carbon is pumped through heat exchanger 9 where it is heated to a temperature of not exceeding about 350° F., and preferably not exceeding about 200° F., by indirect contact with steam entering heat exchanger 9 through line 10. The exhaust steam exits heat exchanger 9 through line 11. Although the eventual desired temperature range for the chemical reactions of the present process is about 275°-350° F., operational considerations, i.e., evolution of objectionable gases and foaming of the spent alkylation acid, followed by scale formation, limit the temperature to which the spent acid should be heated in heat exchanger 9. Even at lower temperatures, some scale buildup will occur in heat exchanger 9, however, small amounts of scale can be removed by flushing heat exchanger 9 with sulfuric acid. The hot spent acid next passes by line 12 to reactor 13.

Sulfuric acid of at least about 93%, and preferably about 93-98%, $H_2SO_4$ strength enters the process via line 14. Technical grade sulfuric acid (93-98%) has been found to be very satisfactory for this use. Oleum can be used instead of technical grade acid, however, it is more expensive. Hereinafter, the term "technical grade sulfuric acid" will be used to signify oleum or any type sulfuric acid of at least about 93% $H_2SO_4$ strength. The technical grade sulfuric acid has three major purposes in the present process. First, it is used as a heat source to provide enough heat so that, when mixed with spent acid later in the process, the temperature of the acid mixture is at the desired temperature range of about 275°-350° F. Second, it serves to decrease the viscosity of the spent acid throughout the treatment process. The decreased viscosity allows improved degassing during treatment chemical reactions thereby preventing the formation of the viscous gel that has plagued some spent acid treatment processes. Third, it serves to increase the sulfuric strength of the above-referenced spent acid. The amount of technical grade sulfuric acid addition required depends on the chemical characteristics, i.e., $H_2SO_4$ strength and organic carbon content, of the spent alkylation acid being processed. Preferably, the rate of technical grade sulfuric acid addition via line 14 would be between about 50% and 400% and more preferably between about 75% and 200% of the rate of spent alkylation acid addition. A typical rate of technical grade sulfuric acid addition would be 100% of the rate of spent alkylation acid addition. The technical grade sulfuric acid passes through heat exchanger 15 where it is preferably heated to a temperature of about 350° F. to 500° F. by indirect contact with steam entering heat exchanger 15 via line 17. The precise temperature to which the technical grade sulfuric acid is heated depends on the temperature of the spent alkylation acid with which it is subsequently mixed and, also, on the desired treatment temperature. The exhaust steam exits heat exchanger 15 through line 18. The hot technical grade $H_2SO_4$ next passes by line 16 to reactor 13.

It is not essential to the present treatment process that the technical grade sulfuric acid or the spent alkylation acid be heated prior to entering reactor 13. Some or all of the heating of the two acids could be accomplished after the acids have been put into reactor 13. The described heating procedure, however, is most efficient for industrial applications of the present process since scale formation on heating surfaces, i.e., steam coils or steam jacketing, could be a severe problem and use of steam heating in reactor 13 should be kept at a minimum.

Reactor 13 must be constructed of materials capable of resisting corrosion and/or erosion attack from hot sulfuric acid and organic solids and liquids. The reactor 13 is also equipped with a gas exhaust conduit 19, one or more agitators 20, and two or more baffles 21 arranged to provide a staging effect. Instead of a single, baffled reactor, two or more separate reactors, arranged in series, may be used.

In reactor 13, the mixture of hot spent alkylation acid and hot technical grade sulfuric acid is maintained at a temperature of preferably about 275°-350° F. and more preferably about 300°-325° F. by indirect contact with steam entering reactor steam coil 23 via line 22 and exiting steam coil 23 via line 24. While in this temperature range, the acid mixture is intensely agitated for an average time of at least about 15 minutes, and preferably between about 30 minutes and 2 hours using agitators 20. During the agitation period, chemical reactions occur which, while not completely understood, are believed to be important for the success of the invention. The chemical reactions involve the polymerization of liquid, soluble polyolefins in the spent alkylation acid to form insoluble carbonaceous solids. At least about 80% of the total organic values of the spent alkylation acid are converted into insoluble carbonaceous solids. An excellent measure of the completeness of the reaction converting soluble organic matter to insoluble carbonaceous solids is the Total Organic Carbon Test, a standard laboratory test for determining the total organic carbon content (TOC) of solutions. To determine the percentage conversion of soluble organics to insoluble carbonaceous solids, the TOC test is performed, first, on the untreated spent alkylation acid and then again on the liquid phase of the treated alkylation acid. The difference in the TOC content of the liquid phases of the two acids is a measure of the conversion completeness. (The term "content" in the preceding sentence is the product of concentration by weight and of the respective mass of the acid.)

The conversion of at least about 20% of the total organic values of the spent alkylation acid into insoluble carbonaceous solids reduces the amount of total organic carbon remaining dissolved in the liquid phase to less than about 1% by weight and preferably to less than about 0.5% by weight. The carbonaceous solids formed are relatively inert in acidic solutions and do not tend to interfere with reacting solutions which they may contact. The carbonaceous solids can be efficiently removed on the gypsum filters of wet process phosphoric acid plants.

Although the chemical reactions which occur in reactor 13 are not completely understood, the effects of the reactions are easy to observe. In addition to the formation of insoluble carbonaceous solids, discussed above, gases are evolved during the agitation period as a result of the chemical reactions. The gases, which contain about 80-90% $SO_2$, 2-10% $CO_2$, small amounts of water, and possibly some low molecular weight hydrocarbons ($C_4$-$C_8$), are removed from reactor 13 by gas exhaust conduits 19 and 35. These gases contain about 20 to 35% of the sulfur values originally contained in the spent alkylation acid and should, if possible, be recovered to prevent loss of a valuable resource. In the specific case where the spent alkylation acid treatment plant is located near a wet process phosphoric acid plant, the gases are sent to the air dryer of the sulfuric acid plant usually associated with wet process phosphoric acid plants. If no sulfuric acid plant is located nearby, the gases would have to be sent to a gas clean-up plant in which $SO_2$ could be recovered. Since the gas stream contains an unusually high concentration of $SO_2$, the $SO_2$ may be separated from the other gases and converted to liquid $SO_2$.

Other effects of the chemical reactions occurring in reactor 13 are also observable. The chemical reactions are exothermic and involve the release of a considerable amount of heat. An increase in the viscosity of the acid solution contained in the reactor also occurs.

After the treatment process described above is completed, the acid mixture hereinafter referred to as the treated alkylation acid still contains about 2-3% dissolved $SO_2$ which must be removed before the acid can be used for most purposes. If the spent alkylation acid treatment plant is located near a sulfuric acid plant, the treated alkylation acid can be passed through the air dryer of the sulfuric acid plant for $SO_2$ removal. The proximity of spent alkylation treatment plants to sulfuric acid plants will often occur when the treated alkylation acid is used in wet process phosphoric acid plants since such wet process phosphoric acid plants often incorporate sulfuric acid plants. After exiting the air dryer of the sulfuric acid plant, the $SO_2$-free treated alkylation acid is ready for use, along with the technical grade sulfuric acid normally used in the air dryer, in the attack tanks of the phosphoric acid plants.

A more preferred degassing method, which does not depend on the proximity of a sulfuric acid plant, involves stripping the $SO_2$ from the treated alkylation acid via an air sparging operation. Referring again to FIG. 1, the treated alkylation acid is transferred from reactor 13 via lines 25 and 27 and pump 26 through heat exchanger 28 where it is cooled to below 200° F. by indirect contact with water entering heat exchanger 28 via line 29 and exiting via line 30. The treated alkylation acid is next transported via line 31 to degasification tank 32 which is equipped with an agitator 33. The treated alkylation acid contained in tank 32 is then sparged with air entering tank 32 via line 43. Five to ten minutes of air sparging at a rate of about five to ten volumes of air per minute per volume of treated alkylation acid is sufficient to remove the $SO_2$ from the treated alkylation acid. For example, about five minutes of air sparging at an air sparging rate of 8 volumes of air per minute per volume of treated alkylation acid has been found to reduce the $SO_2$ content of treated alkylation acid from about 3% to about 0.02%. Gases evolved during the degassing operation are exhausted from degasification tank 32 by line 34 and are combined with gases exiting reactor 13 through line 19. The combined gases are sent by line 35 to the air dryer of a sulfuric acid plant, if one is located nearby, or to a gas cleanup plant.

Other methods of degasification can be employed. Instead of air sparging, the degasification operation can be conducted using a combined vacuum-agitation system in degasification tank 32. Also, if a wet process phosphoric acid plant is associated with the alkylation acid treatment plant, a portion of the recycle phosphoric acid stream, which in wet process phosphoric acid plants is returned to the attack tank, can be allowed to enter degasification tank 32 via line 36. The recycle phosphoric acid (22% $P_2O_5$ content in plants using the dihydrate process) dilutes the treated alkylation acid and reduces its viscosity thereby enabling an effective $SO_2$ degassing operation to be carried out (with or without air sparging) in degasification tank 32. Accelerated corrosion problems and the release of undesirable gaseous fluorine products limit the desirability of this latter degasification method.

Industries other than the wet process phosphoric acid industry may require removal of the carbonaceous solids before the treated alkylation acid can be used. Even in the wet process phosphoric acid industry, it may be found desirable to remove at least some of the carbonaceous solids. Preferably, such removal is accomplished after the degassing operation described above is completed. Standard solids-liquid separation methods such as filtration may be used.

After degassing operations and solids separation operations (if required) are completed, the treated alkylation acid is ready for use. If the treated alkylation acid is to be used in wet process acid plants to acidulate phosphate rock, the treated acid would have to be transported to the attack tank, that is, to the reaction vessel in wet process phosphoric acid plants in which such acidulation takes place. In the specific case where the spent alkylation acid treatment plant is located near a wet process phosphoric acid plant, the treated alkylation acid preferably would be transported via lines 37 and 39 and pump 38 to the attack tank 40 of the adjacent wet process phosphoric acid plant. In the attack tank it would be used, along with technical grade sulfuric acid entering attack tank 40 via line 41, to acidulate phosphate rock entering attack tank 40 by line 42. Preferably, about 10-30% of the sulfuric acid requirement to acidulate incoming phosphate rock is provided by the treated alkylation acid. This corresponds to about 5-15% of the sulfuric acid requirement being met with untreated spent alkylation acid. It was surprisingly discovered that when the amount of treated alkylation acid used is in the stated range and the phosphoric acid produced by the acidulation is subsequently treated to recover uranium, the uranium recovery operation is more efficient than when the phosphoric acid is produced by acidulation with technical grade sulfuric acid alone. For example, crud formation, a common problem in uranium recovery operations, is reduced when treated alkylation acid is used. Excessive crud formation is undesirable because it causes the loss of phosphoric acid, uranium values and the expensive solvents used to extract uranium from the phosphoric acid. In addition to reduced crud formation, the phosphoric acid produced has better phase disengagement characteristics which allows for reduced settler sizes in the solvent extraction circuits.

The phosphoric acid produced by this process was found to have better clarification characteristics than the brown or black phosphoric acid usually produced by present commercial wet process phosphoric acid processes. The invented process produced a phosphoric acid known in the industry as green phosphoric acid, a grade of phosphoric acid of such good clarity that the acid usually has a higher market value than ordinary wet process phosphoric acid.

When more than about 30% of the sulfuric acid requirement is provided by treated alkylation acid, the phosphoric acid produced is of satisfactory quality in most aspects, however, filtration rate problems begin to be encountered with the gypsum filters. Otherwise, phosphoric acid produced by the preferred process causes no serious filtration problems. Less than about 10% of the sulfuric acid requirement may be replaced by treated alkylation acid, however, the phosphoric acid produced does not possess the improved characteristics to quite the same extent as phosphoric acid produced utilizing the preferred amounts of treated alkylation acid.

The technical reasons for the superior quality of the phosphoric acid produced by the present process are not completely understood, however the insoluble carbonaceous solids produced during the alkylation acid treatment process are believed to play a key role. The carbonaceous solids produced apparently are activated, to some extent, by the heat and/or chemical activity of the treatment process. The activation causes the solids to take on cation exchange characteristics, e.g., the solids remove cations such as $Ca^{++}$ from solution. In addition to cation exchange characteristics, the carbonaceous solids appear to take on the role of impurity scavengers in that, for example, they remove colorizing agents and crud forming agents from wet process phosphoric acid. This impurity scavenging ability can be readily shown by removing the carbonaceous solids from alkylation acid and using the solids to treat black or brown phosphoric acid produced without the use of treated alkylation acid. The solids decolorize the phosphoric acid, giving a phosphoric acid with a light green color. The cation exchange and impurity scavenging characteristics of the solid organic particles are potentially valuable characteristics.

The treatment of the spent alkylation acid may be performed batchwise as well as in a continuous mode although the continuous mode is preferred. The apparatus of FIG. 1 can be operated in a continuous or batch mode. When the batch mode of operation is practiced, technical grade sulfuric acid is added to a batch reactor and heated to about 275°-350° F. Spent alkylation acid is then added to the batch reactor and the blended acids are heated back to about 275°-350° F. and subjected to moderate to intense agitation for at least 15 minutes and, preferably, for about 30 minutes to two hours. The treatment should be continued until the evolution of gas becomes very low. Additional quantities of technical grade sulfuric acid are then added to cool the blended acids, to reduce viscosity and to increase the $H_2SO_4$ concentration of the blended acids to at least about 93%. As in the continuous process, the ratio of spent alkylation acid to technical grade sulfuric acid used is typically about 1/1 but can vary between preferably about 0.50/1.0 and 4.0/1.0 although a more preferable range is about 0.75/1.0 to 2.0/1.0. The batch mode of operation can be varied considerably. For example, spent alkylation acid and technical grade sulfuric acid can be blended before being placed in the batch reactor. Also, the spent alkylation acid and the technical grade sulfuric acid may be heated prior to entering the reactor. Multiple reactors may be used and their operation sequenced so that the operation becomes semi-continuous.

Batch operation has major operational disadvantages when compared to continuous operation. The exothermic nature of the chemical reactions cause temperature increases which must be accounted for when bringing the reactor acids up to the desired temperature. A very wide variation in gas evolution rates occurs in batch operation as the chemical reactions are initiated, proceed to a maximum level of activity and then decline in activity as the reactions are completed. Gas handling systems must be able to handle the maximum rate of gas evolution. The acid solutions in the reactor also suffer a large increase in viscosity as the solid organics are formed. This viscosity increase does not appear as pronounced when the continuous mode of operation is practiced. Nevertheless, the quality of acid treated by batch operation is as good as acid treated by continuous operation.

In summary, the present process has resolved problems that have long confronted those who have attempted to treat spent alkylation acid to produce a commercially usable alkylation acid. One of the most innovative features of the process is its use of technical grade sulfuric acid to dilute the spent alkylation acid during the treatment procedure. This step enables the spent acid to be handled easily throughout the treatment procedure thus eliminating the handling problems that have detrimentally affected other spent alkylation acid treatment processes. For example, the dilution step keeps the viscosity of the alkylation acid low thus promoting degassing. Proper degassing prevents the formation of the viscous, hard-to-handle gel that forms in some spent acid processes. This dilution step combined with other process innovations produces a treated alkylation acid that can, in turn, be used to produce a wet process phosphoric acid with satisfactory filtration characteristics and that, surprisingly, is superior to ordinary wet process phosphoric acid in key uranium-recovery indicators. In addition to the unexpected production of wet process phosphoric acid with superior uranium-recovery indicators, the process serendipitously produces carbonaceous solids with valuable cation exchange properties. An exceptionally concentrated $SO_2$ gas stream of potential value is also produced.

In resolving problems associated with treating spent alkylation acid, the inventors have also modified the wet process for producing phosphoric acid. Thus, in a typical wet process for producing phosphoric acid, a phosphate rock is finely ground and is slurried with sulfuric acid and recycled, dilute phosphoric acid. The present process allows treated alkylation acid to be substituted for part of the sulfuric acid required. The slurry of gypsum produced by the reaction of phosphate rock with sulfuric acid and/or treated alkylation acid is next filtered to remove the gypsum. The phosphoric acid, which typically contains 25% to 35% $P_2O_5$ may next be processed to recover uranium by one of the several existing processes.

The most commonly used processes for uranium recovery are solvent extraction processes. In such processes a water immiscible solvent is mixed with a phosphoric acid which contains dissolved uranium. The uranium is preferentially taken up by the water immiscible solvent and is recovered from the solvent as uranium oxide, which is also known as yellow cake. One of the best known processes is the DEHPA/TOPA process. This recovers uranium in the plus 6 valence state. In this process a phosphoric acid which contains uranium is contacted with a mixture of two organic solvents, di-2-ethylhexylphosphoric acid (D-2EHPA) and trioctylphosphine oxide (TOPO). The uranium is readily transferred to the organic phase from the aqueous phosphoric acid phase. The uranium is then stripped from the loaded organic phase by one of several known techniques.

The present process unexpectedly reduces the amount of crud which occurs when various uranium extraction processes are used, and in particular, when the DEHPA/TOPO process is used. After uranium removal (when performed), the resulting dilute phosphoric acid is then fed to conventional wet process evaporators where it is concentrated to a $P_2O_5$ content of about 45% to 55%. This "merchant grade" phosphoric acid is typically used or sold as is but may optionally be upgraded to a "stabilized wet process phosphoric acid" via additional process steps, i.e. the merchant grade acid is held in a crystallization zone for a period of at least about 8 hours and no more than about 48 hours, centrifuged to reduce its total solids content to less than about 2.0% and concentrated in wet process evaporators to a final $P_2O_5$ strength of at least 58%. A process to produce stabilized phosphoric acid is described in Astley et al U.S. Pat. No. 4,487,750.

The present process for treating spent alkylation acid is particularly well-suited for implementation near wet process phosphoric acid plants which are adjacent to sulfuric acid plants. The advantage of such a location is further increased if the wet process phosphoric acid plant recovers uranium as a byproduct.

Although the present process satisfies an on-going need in wet process phosphoric acid plants for sources of much-used sulfuric acid, it is not intended that implementa-tion of the process or use of the sulfuric acid product produced by the process should be limited solely to the wet process phosphoric acid industry. Sulfuric acid is one of the most widely used chemicals and the product of the present process is believed suitable for use in other industries which employ sulfuric acid.

The following examples will illustrate the invented process but are not intended to limit the scope of the invention.

EXAMPLE 1

Figure 2:
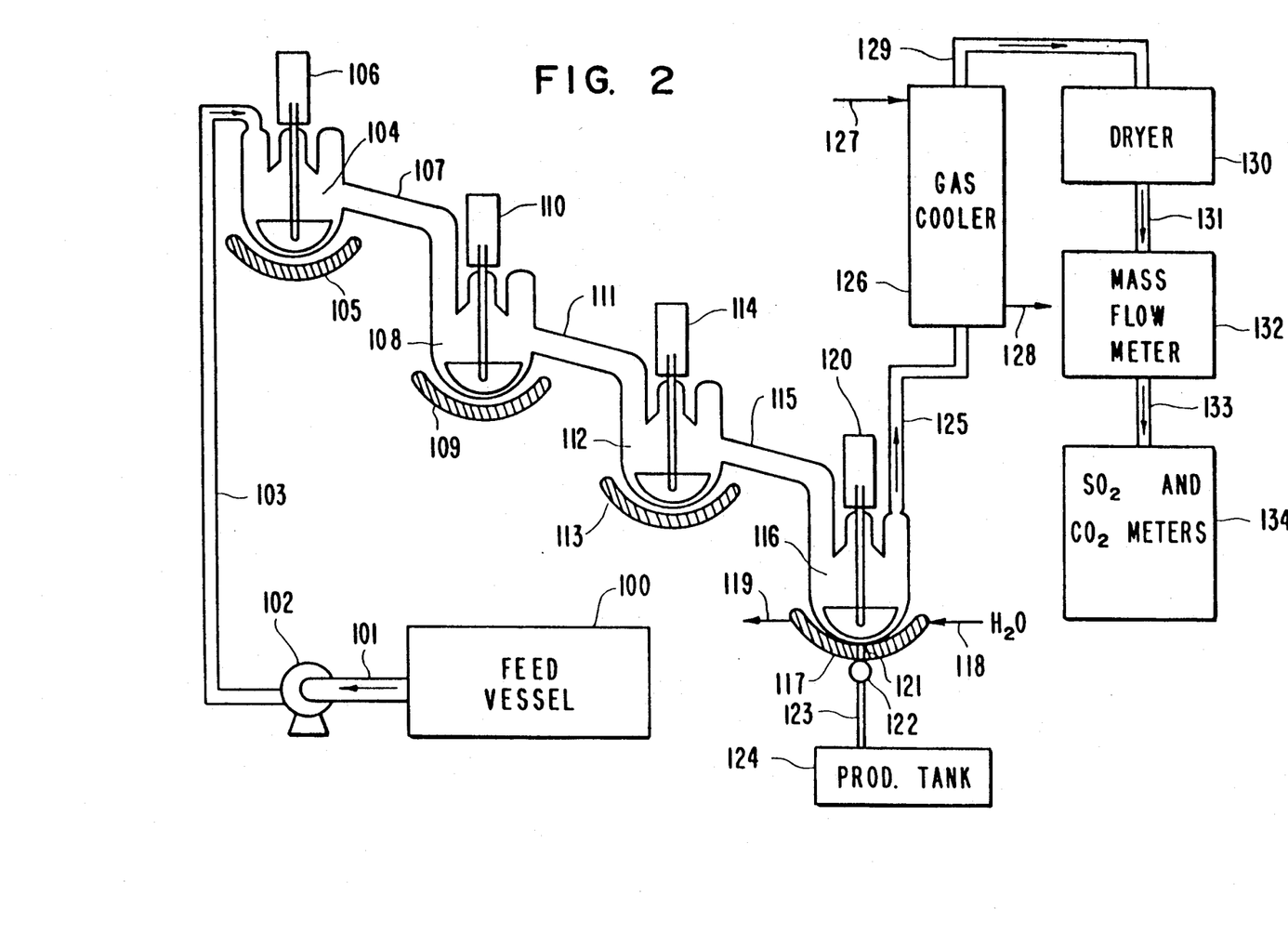

Example 1 consists of a series of continuous tests performed to illustrate the essential features of the preferred mode of the invention. The apparatus of FIG. 2 was used. Referring to FIG. 2, the treatment of the alkylation acid was carried out in a cascade of three reaction vessels 104, 108 and 112-the vessels being 500 ml. laboratory round bottom glass flasks. A fourth 500 ml round bottom flask in the cascade, quench vessel 116, received and cooled the treated alkylation acid from reaction vessel 112. Gases evolved during the process exited the process from quench vessel 116 by means of line 125. The gas, mostly $SO_2$, was cooled in cooler 126 to about 120° F. by indirect contact with cooling water entering by line 127 and exiting by line 128. The gases then moved by line 129 to dryer 130 which contained the desiccant silica gel. After drying the gases flowed by lines 131 and 133 through mass flow meter 132 and $SO_2/CO_2$ meter setup 134.

The feed acid to the process was prepared in blended feed vessel 100, a laboratory glass vessel of about two liter capacity. Initially, approximately 1900 gms. of spent alkylation acid (3.91% TOC content and 87.7% $H_2SO_4$) from a Louisiana oil refinery and approximately 1900 gms. of 93.7% technical grade sulfuric acid were mixed in feed vessel 100. Prior to the beginning of the tests, pump 102 and glass tubing sections 101, 103, 107, and 111 were used to transfer blended acid from feed vessel 100 to fill cascaded reaction vessels 104, 108, and 112. Reaction vessels 104, 108, and 112 were stirred by electrically-driven laboratory stirrers 106, 110 and 114 respectively, and heated by electric laboratory heating mantles 105, 109, and 113 respectively. The blended acid in the three reaction vessels 104, 108, and 112 was heated to 325° F. prior to the start of the test.

The tests were then begun with pump 102 continuously supplying the blended acid to the first reaction vessel 104 while the treated acid product was continuously removed from reaction vessel 112 and transferred via tubing 115 to quench vessel 116 which was equipped with an electrically-driven laboratory stirrer 120. The treated acid was cooled to about 130° F. in quench vessel 116 by indirect contact with water entering cooler 117 via line 118 and exiting cooler 117 via line 119. The treated alkylation acid was then transferred to product tank 124 by means of valve 122, and lines 121 and 123. The test variables were temperature (300° F. and 325° F.) and nominal total residence time (60 and 90 minutes) of the acid in the reaction vessels 104, 108, and 112. Collection of product began after operation of the system for three nominal residence times. Each test, except for the first, was started with the heel from the previous run.

The test results, Tables 1 and 2, showed the following:

1. Satisfactory TOC removal, i.e., conversion of the soluble organic values to insoluble carbonaceous solids of 88.0-93.9% was obtained. Increases in residence time and temperature caused only minor improvement in TOC removal.

2. Evolution of $SO_2$ increased with increasing temperature and residence time.

3. Sulfur losses as $SO_2$ were significant, representing 21% of the sulfur values of the original spent alkylation acid at the lower temperature and residence time and 38% at the higher temperature and residence time. Economic demands and environmental restraints necessitate an adequate gas collection system for an industrial plant using the process.

TABLE 1

CONTINUOUS SPENT ALKYLATION ACID TESTS:
EFFECT OF TEMPERATURE AND RESIDENCE
TIME ON TOTAL ORGANIC CARBON REMOVAL
AND ON TREATED ALKYLATION ACID STRENGTH

| Test No. | Temp. (°F.) | Residence Time (min.) | Treated Acid Strength (% $H_2SO_4$) | TOC Removal (%) |
|---|---|---|---|---|
| 1 | 325 | 60 | 87.7 | 93.9 |
| 2 | 325 | 60 | 86.7 | 91.1 |
| 3 | 325 | 90 | 86.0 | 92.3 |
| 4 | 300 | 60 | 87.6 | 88.0 |

TABLE 2

CONTINUOUS SPENT ALKYLATION ACID TESTS:
EFFECT OF TEMPERATURE AND RESIDENCE
TIME ON GAS EVOLUTION

| Test No. | Temp. (°F.) | Res. Time (min.) | Gas Evolution (SCF/gal. of feed acid) | AA Acid $SO_2$ Conc. of Gas (%) | Loss In Gas (%)* |
|---|---|---|---|---|---|
| 1 | 325 | 60 | 18.8 | 96.6 | 34 |
| 2 | 325 | 60 | 16.2 | 91.0 | 27 |
| 3 | 325 | 90 | 23.4 | 88.1 | 38 |
| 4 | 300 | 60 | 12.0 | 93.7 | 21 |

*These numbers represent the amount of alkylation acid lost through $SO_2$ evolution and are based on untreated alkylation acid only. The corresponding value for the treated alkylation acid, i.e., blend of alkylation acid and technical sulfuric acid, is half the value shown.

EXAMPLE 2

Example 2 consisted of a test performed using the "attack tank simulator." The attack tank simulator is a collection of small scale laboratory and bench scale equipment arranged to simulate the attack tank and related equipment of a full scale wet process phosphoric acid plant located at Uncle Sam, La. As previously discussed, phosphate rock is acidulated with sulfuric acid in the attack tank. The acidulation causes the formation of gypsum which must be later filtered from the process. The attack tank and related equipment constitute an important part of wet process phosphoric acid plants and considerable management and technical attention is paid to the operation of the system. The object of Example 2 was to determine how the use of treated alkylation acid in the attack tank would affect the operation of the phosphoric acid plant and the key uranium recovery indicators in the phosphoric acid produced.

Treated alkylation acid for the attack tank simulator test was obtained from a series of continuous tests performed as in Example 1. The feed to the attack tank simulator consisted of 80% technical grade sulfuric acid (93% $H_2SO_4$) and 20% treated alkylation acid from Example 1. This corresponds to a feed of 90% technical grade sulfuric acid (93% $H_2SO_4$) and 10% spent, i.e., untreated, alkylation acid.

The treated alkylation acid was introduced into the system by, first, mixing it with 22% $P_2O_5$ recycle phosphoric acid in the ratio of 420 grams treated alkylation acid to 1000 ml 22% $P_2O_5$ phosphoric acid, and then feeding the mixture continuously to the attack tank. The remainder of the sulfuric acid required was fed to the attack tank simulator via a separate line. Samples of the phosphoric acid produced in the attack tank simulator were continuously taken and tests were made to determine the uranium recovery indicators (Table 3).

For comparison, technical grade sulfuric acid was substituted for the treated alkylation acid and the attack tank simulator was operated as described above. The operation of the attack tank simulator was stable and satisfactory in both cases. The effects of using treated alkylation acid on key uranium recovery indicators is shown in Table 3.

TABLE 3

EFFECT OF USING TREATED ALKYLATION ACID
ON KEY URANIUM RECOVERY 2 INDICATORS[1]

| Type Of Acid | (Volumetric %) Black Solids | (Phase Disengagement) Time (Min.) | Ml. Crud Liter |
|---|---|---|---|
| $H_2SO_4$ (Tech.) | 0.07 | 2.5 | 5.0 |

TABLE 3-continued

EFFECT OF USING TREATED ALKYLATION ACID ON KEY URANIUM RECOVERY 2 INDICATORS[1]

| Type Of Acid | (Volumetric %) Black Solids | (Phase Disengagement) Time (Min.) | Ml. Crud Liter |
|---|---|---|---|
| Treated AA* | 0.05 | 1.5 | 1.5 |

*AA = Alkylation acid

The indicators and the test procedures to determine them were developed by Freeport Research and Engineering Inc. staff to provide a means for evaluating wet process phosphoric acids for uranium recovery efficiency. The Volumetric % Black Solids test provides a measure of the troublesome black solids in phosphoric acid that can contribute to crud formation. The Phase Disengagement Time test measures the time required for complete separation of the aqueous phase (phosphoric acid phase) and the organic phase (the organic phase is composed of the organic extractant which is used to extract uranium from phosphoric acid). This is an important test since the rate at which the phases separate would determine the size of certain equipment used in the uranium extraction operation. The Crud Per Liter test provides a measure of the crud forming potential of the phosphoric acid from which uranium is to be extracted.

The tests clearly show (lower test values indicate better results) the advantages of using treated alkylation acid. Superior uranium recovery indicators were obtained when treated alkylation acid was used. In a full scale industrial application of the present process, the superior uranium recovery indicators would have translated into the formation of less crud than would be formed than if technical grade sulfuric acid alone had been used. Less crud would mean reduced loss of uranium, phosphoric acid and the expensive organic solvents used to extract uranium from wet process phosphoric acid.

EXAMPLE 3

Example 3 is a test using the batch mode of operation to treat spent alkylation acid. The sequence of steps used to treat the spent alkylation acid was as follows 425 grams of technical grade sulfuric acid of 96.1% $H_2SO_4$ strength were added to the reactor. A 3 liter, jacketed glass vessel equipped with an agitator was attached to the reactor. The gas evolved during the treatment reactions was directed through gas tubing leading to a gas collection and measurement system.

The technical grade acid was then heated to 300° F. 850 grams of spent alkylation acid (4.52% TOC content and 88.6% $H_2SO_4$) was then added to the reactor and the temperature of the agitated (100 rpm) acid mixture was brought back up to 300° F. As the acid mixture was heated, some gas evolution was observed as the temperature reached about 200° F., and significant gas evolution began to be observed in the 240°-260° F. range, indicating that the treatment chemical reactions are beginning to occur more rapidly in that temperature range. The evolved gases were exhausted from the reactor, cooled in a condenser, dried by contact with silica gel, and passed through mass flow meters and $SO_2/CO_2$ monitors. Gas evolution (over 90% $SO_2$ content) from the reactor continued to increase rapidly in intensity as the temperature rose. Agitator impeller torque was also monitored and did not change during the early temperature rise but then rapidly rose to a maximum value just as gas evolution began to decline. This increase in the viscosity of the acid mixture is believed to signify a late stage of polymerization of the soluble organic matter contained in the spent alkylation acid. Gas evolution continued at a diminishing rate for some time after a maximum impeller torque was reached. When gas evolution reached a very low level indicating that the treatment chemical reactions were essentially complete, 425 grams of technical grade sulfuric acid of 96.1% $H_2SO_4$ strength was added to the reactor to cool the product, stop the reaction, reduce viscosity of the now-treated acid and to increase the $H_2SO_4$ concentration of the treated acid. The test was stopped at this point. The results of two tests performed by this procedure are shown in Table 4:

TABLE 4

BATCH REACTIONS BETWEEN SPENT ALKYLATION ACID AND TECHNICAL GRADE SULFURIC ACID AT 300° F.

| Run | Rx[1] Time (Min) | Degas Time (Min) | Gas: $SO_2$ Conc. (%) | Torque Ratio[2] | TOC Removal (%) |
|---|---|---|---|---|---|
| 1 | 45 | 75 | 94[3] | 1.5 | 89.4 |
| 2[4] | 43 | 62 | 98[5] | 1.3 | 89.7 |

[1]Rx = Reaction time (time to reach maximum impeller torque)
[2]Ratio of the maximum torque of the reaction acid mixture to the torque of technical grade sulfuric acid only; Both measurements at the same operating temperature.
[3]Min. $SO_2$ = 91%, Max. $SO_2$ = 97%.
[4]Agitated at 50 rpm instead of 100 rpm.
[5]Min. $SO_2$ = 95%, Max. $SO_2$ = 100%.

The product acid from this run was entirely satisfactory as far as product quality is concerned. As mentioned earlier, however, the batch mode of operation would probably be less desirable than the continuous mode in commercial operations because of the variable rate of gas evolution in batch operations. The variable rate of gas evolution would necessitate the installation of a larger gas collection system than would be required in continuous operation.

We claim:

1. A process for treating spent alkylation acid to recover a sulfuric acid product, comprising:
   a. mixing spent alkylation acid having an $H_2SO_4$ concentration of at least 80% with a quantity of sulfuric acid of at least 93% $H_2SO_4$ concentration to increase the sulfuric acid concentration and decrease viscosity of the spent alkylation acid and to form an acid blend; and
   b. agitating the acid blend to provide a homogenous blend of the two acids, and maintaining the acid blend at a temperature of at least about 275°-350° F. for a period of at least about 15 minutes thereby providing a treatment step wherein a substantial amount of the soluble organic compounds contained in the spent alkylation acid is converted to insoluble carbonaceous solids.

2. The process of claim 1 wherein the average contact time of the alkylation acid and sulfuric acid during the treating is between about one-half hour and two hours.

3. The process of claim 1 wherein the average contact time of the alkylation acid and sulfuric acid during the treating is about one hour.

4. The process of claim 1 wherein the temperature of the acid blend is maintained at a temperature of about 300°-325° F. during the treatment retention step.

5. The process of claim 1 wherein the spent alkylation acid is heated to a temperature not exceeding about 200° F. prior to contact with said sulfuric acid.

6. The process of claim wherein the spent alkylation acid is heated to a temperature not exceeding about 350° F. prior to contact with said sulfuric acid.

7. The process of claim 1 wherein the sulfuric acid is heated to a temperature of about 350°-500° F. prior to contact with said alkylation acid.

8. The process of claim 1 wherein said treatment step is continued until at least about 80% of the soluble organic material contained in the spent alkylation acid is converted to insoluble carbonaceous solids.

9. The process of claim 1 wherein said treatment step is continued until a total organic solids content of the liquid phase of the treated spent alkylation acid is less than 1.0%.

10. The process of claim 1 wherein said treatment step is continued until a total organic solids content of the liquid phase of the treated spent alkylation acid is less than about 0.5%.

11. The process of claim 1 wherein the added sulfuric acid used is technical grade sulfuric acid of about 93-98% $H_2SO_4$.

12. The process of claim 1 wherein the added sulfuric acid used is oleum.

13. The process of claim 1 wherein the treatment is performed in a multistage reactor or in several reactors arranged in series.

14. The process of claim 1 wherein the process is carried out in the continuous mode.

15. The process of claim 1 wherein the process is carried out in the batch mode.

16. The process of claim 1 wherein the product of treated alkylation acid and insoluble carbonaceous solids is cooled to below about 200° F., and air sparged for at least about five minutes to remove gases.

17. The process of claim 1 wherein the product of treated alkylation acid and insoluble carbonaceous solids is cooled to about 120°-140° F. and is blended with phosphoric acid and agitated for at least about five minutes to remove gases.

18. The process of claim 17 wherein the phosphoric acid blended with the cooled treated alkylation acid product contains about 22% by weight $P_2O_5$ phosphoric acid and is from a recycle stream of wet phosphoric acid plants.

19. The process of claim 1 wherein the treated alkylation acid produced is passed through an air dryer of a sulfuric acid plant to remove the $SO_2$ contained in the treated alkylation acid.

20. The process of any one of claims 1, 16 or 17 wherein gases evolved in the contacting and agitating of the alkylation acid and sulfuric acid or an air sparging to remove gases are forwarded directly to the intake of a sulfuric acid plant where said gases are converted into sulfuric acid.

21. The process of any one of claims 1, 16 or 17 wherein gases evolved in the contacting and agitating of the alkylation acid or an sulfuric acid and air sparging to remove gases are forwarded to a gas treatment plant where the $SO_2$ values are recovered.

22. The process of any one of claims 1, 16 or 17 wherein the $SO_2$ in gases evolved in the contacting and agitating of the alkylation acid and sulfuric acid or an air sparging to remove gases is separated from other gases in the gas stream and compressed to produce a liquid $SO_2$ product.

23. The process of claim 1 wherein the treated alkylation acid product is used to acidulate phosphate rock in wet process phosphoric acid production.

24. The process of claim 23 wherein the treated alkylation acid product is used to acidulate phosphate rock in a wet process phosphoric acid plant employing a uranium recovery method.

25. The process of claim 1 wherein the carbonaceous solids produced in the treatment process are separated from the treated alkylation acid product for use as cation exchange agents.

26. The process of any one of claims 16 or 17 wherein the carbonaceous solids are separated from the treated alkylation acid for use as cation exchange agents.

27. The process of claim 1 wherein said spent alkylation acid of step (a) contains about 2% to 7% organic carbon before mixing with said sulfuric acid.

28. A process for treating spent alkylation acid to recover a sulfuric acid product, comprising:
   a. heating spent alkylation acid having an $H_2SO_4$ content of 80-93% to a temperature not exceeding about 350° F.;
   b. heating sulfuric acid having a concentration of at least 93% $H_2SO_4$ to a sufficient temperature so that when the sulfuric acid is combined with the hot spent alkylation acid, the resulting temperature of the acid mixture will be about 300°-325° F.;
   c. transferring a sufficient quantity of the hot spent alkylation acid and a sufficient quantity of the hot sulfuric acid into a reactor so that the quantity of sulfuric acid present in the reactor is about 50% to 400% of the quantity of spent alkylation acid present in the reactor to decrease viscosity of the spent alkylation acid;
   d. agitating the mixture of the spent alkylation acid and sulfuric acid contained in the reactor to provide a homogenous blend of the two acids;
   e. agitating the acid blend and maintaining the acid blend at a temperature of about 300°-325° F. for an average time of between about one-half and two hours thereby providing a treatment step wherein a substantial amount of the soluble organic material contained in the spent alkylation acid is converted to insoluble carbonaceous solids;
   f. removing the mixture of treated alkylation acid and insoluble carbonaceous solids from the reactor and cooling said mixture to about 120°-140° F.; and
   g. transferring the cooled mixture of treated alkylation acid and insoluble carbonaceous solids to a vessel equipped to remove gasses and air sparging the mixture at a rate of 5-10 volumes of air per minute per volume of treated alkylation acid for at least about five minutes.

29. The process of claim 28 wherein the alkylation acid and sulfuric acid are maintained at 300°-325° F. for about one hour.

30. The process of claim 28 wherein the temperature of the acid blend is maintained at a temperature of about 275°-350° F. during the treatment step.

31. The process of claim 28 wherein the spent alkylation acid is heated to a temperature not exceeding about 200° F. prior to entering the reactor.

32. The process of claim 28 wherein the sulfuric acid is heated to about 350°-500° F. prior to entering the reactor.

33. The process of claim 28 wherein the sulfuric is heated to a temperature of not more than about 500° F. prior to entering the reactor.

34. The process of claim 28 wherein the treatment is performed in a multistage reactor or several reactors in series.

35. The process of claim 28 wherein said treatment step is continued until at least about 80% of the soluble organic material contained in the spent alkylation acid is converted to insoluble carbonaceous solids.

36. The process of claim 28 wherein said treatment step is continued until the total organic carbon content of the treated spent alkylation acid is less than about 1.0%.

37. The process of claim 28 wherein said treatment step is continued until the TOC content of the treated spent alkylation acid is less than about 0.5%.

38. The process of claim 28 wherein the acid strength of sulfuric acid blended with the alkylation acid is at least about, 93% $H_2SO_4$.

39. The process of claim 28 the sulfuric acid blended with the alkylation acid is technical grade sulfuric acid of 93 to 98% $H_2SO_4$ strength.

40. The process of claim 28 wherein the quantity of sulfuric acid added is about 75% to 200% of the quantity of spent alkylation acid added.

41. The process of claim 28 wherein the sulfuric acid blended with the alkylation acid is oleum.

42. The process of claim 28 wherein the process is carried out in the continuous mode.

43. The process of claim 28 wherein the process is carried out in the batch mode.

44. The process of claim 28 wherein the treated alkylation acid product is used to acidulate phosphate rock in wet process phosphoric acid production.

45. The process of claim 44 wherein the treated alkylation acid product is used to acidulate phosphate rock in a wet process phosphoric plant employing a uranium recovery method.

46. The process of any one of claims 28, 42 or 43 wherein gases evolved are forwarded directly to the intake of a sulfuric acid plant where said gases are converted into sulfuric acid.

47. The process of any one of claims 28, 42 or 43 wherein gases evolved are forwarded to a gas treatment plant where the $SO_2$ values contained in the gases are recovered.

48. The process of any one of claims 28, 42 or 43 wherein the $SO_2$ in gases evolved are separated from other gases in said gases and compressed to produce a liquid $SO_2$ product.

49. A process for recovering sulfuric acid from spent alkylation acid comprising:
 a. admixing spent alkylation acid having an $H_2SO_4$ content of 80-93% containing sulfuric acid and soluble organic compounds with a sulfuric acid source containing at least 93% sulfuric acid to decrease viscosity of said spent alkylation acid and to form an acid blend;
 b. agitating the acid blend while heating to a temperature of about 275° F. to 350° F. for sufficient time to convert said soluble organic compounds in said spent alkylation acid to substantially insoluble organic compounds; and
 c. separating said insoluble organic compounds from said blend thereby forming substantially pure sulfuric acid.

50. A process for recovering sulfuric acid from spent alkylation acid comprising:
 a. admixing spent alkylation acid containing about 80-93% sulfuric acid and soluble organic compounds with a source of sulfuric acid comprising at least 93% sulfuric acid to decrease viscosity of the alkylation acid and to form an acid blend;
 b. agitating and heating the acid blend at a temperature of about 275° F. to 350° F. for sufficient time whereby said soluble organic compounds are converted to substantially insoluble organic compounds;
 c. separating insoluble organic compounds from said acid blend; and
 d. passing said acid blend through an air sparger to remove sulfur dioxide contained in the acid blend, thereby forming substantially pure sulfuric acid.

51. A process for treating spent alkylation acid to recover a sulfuric acid product, comprising:
 a. mixing spent alkylation acid having an $H_2SO_4$ concentration of 80%-93% with a quantity of sulfuric acid of at least 93% $H_2SO_4$ concentration to decrease viscosity of the spent alkylation acid and to form an acid blend; and
 b. agitating the acid blend to provide a homogenous blend of the two acids, and maintaining the acid blend at a temperature of at least about 275°-350° F. for a period of at least about 15 minutes thereby providing a treatment step wherein a substantial amount of the soluble organic compounds contained in the spent alkylation acid is converted to insoluble carbonaceous solids, wherein said alkylation acid of step (a) is undiluted before mixing with said sulfuric acid.

* * * * *